Patented Sept. 14, 1943

2,329,671

UNITED STATES PATENT OFFICE 2,329,671

ARALKYL PHENOL AND METHOD FOR ITS PRODUCTION

Alger L. Ward, Drexel Hill, Pa., assignor to The United Gas Improvement Company, a corporation of Pennsylvania No Drawing. Application March 28, 1939, Serial No. 264,592

20 Claims. (Cl. 260—619)

The present invention relates to the production of aryl substituted phenols. More particularly it relates to aryl substituted phenols produced by reacting a phenol with an unsaturated hydrocarbon or groups of hydrocarbons of the general type

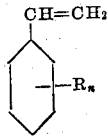

in which R represents a lower alkyl substituent group and n indicates that one or more than one substituent group may be present at the same time.

Unsaturated hydrocarbons of this type may be obtained from light oil produced in the pyrolysis of petroleum oil, as, for example, in the manufacture of carburetted water gas and oil gas. In such gas manufacture the lower boiling condensates and the distillate from the tar are termed light oil.

The higher boiling portion of the light oil contains a variety of unsaturated aromatic hydrocarbons mixed with saturated aromatic hydrocarbons of neighboring boiling points.

For example, the higher boiling portion of a light oil produced in the manufacture of oil gas may contain styrene, nuclearly lower alkylated styrene such as ortho, para, and meta methyl styrene, as well as indene and other unsaturated aromatic hydrocarbons in admixture with the xylenes, cumene, pseudo-cumene, durene, and possibly other saturated aromatic hydrocarbons. These unsaturated hydrocarbons may be concentrated by further fractionation of the higher boiling portion of the light oil. For example, in a light oil produced in the manufacture of oil gas, with careful fractionation methyl styrenes have been concentrated as the preponderant unsaturation in a cut taken from 167 to 175° C., para-methyl styrene predominating in a cut from 167° C. to 172° C. and meta-methyl styrene predominating in a cut from 172° C. to 175° C.

When such light oil fractions are reacted with phenols in the presence of a small quantity of mineral acid and under controlled temperature conditions, aralkyl phenols may be produced corresponding to the styrene homologues obtained in the fractions.

The entire portion of the light oil containing such styrene homologues may be reacted with phenol to give mixed aralkyl phenols corresponding to the aromatic unsaturates, or preferably the light oil may be further fractionated to concentrate aromatic unsaturates of the above type individually or in groups and phenols reacted with them to give individual or groups of aralkyl phenols corresponding to the individual or groups of such styrene homologues.

By phenols I intend to means the mono and polyhydroxy derivatives of benzene and its homologues, such as for example, phenol, cresol, resorcinol, pyrogallol, hydroquinone, pyrocatechol, naphthols, their substituted products, and the like. As examples of mineral acids suitable as catalysts mention may be made of sulfuric and phosphoric acids.

I have found that these aralkyl phenols may be reacted with aldehydes to form resins which are soluble in drying oils such as linseed oil and tung oil. This characteristic gives them great value for use in coating compositions such as drying oil varnishes and lacquers in which the usual phenol aldehyde condensation products cannot be used due to their incompatibility with such drying oils.

By aldehydes it is intended to mean the aldehydes customarily employed in the production of phenol aldehyde condensation products of which, for example, formaldehyde and furfural may be preferred because of their relative cheapness.

I have found that the proportion of mono substituted phenols to di-substituted and tri-substituted phenols produced in the reaction may be controlled by controlling the proportion of phenol to the unsaturated aromatic hydrocarbons, a molar excess of phenol having been found desirable when the desired product is a mono substituted phenol. However, the excess of phenol may be limited by practical considerations and it may be desirable to employ proportions resulting in the production of both mono and disubstituted products.

The following is an illustrative example of the production of an aralkyl phenol of the type of the present invention.

Example 1

Three mols of phenol (282 grams) were weighed into a 3 necked flask equipped with stirring device, dropping funnel and a thermometer. To this was added 0.3 cc. of 96% $H_2SO_4$. 153 grams of a hydrocarbon fraction containing 1 mol of para-methyl styrene (118 grams) as determined by titration of the unsaturation present were added drop by drop with vigorous agitation. To facilitate agitation at the start of the reaction, the phenol was melted by heating it on a water bath to about 42° C.

By variation of the rate of addition of the hydrocarbon fraction the temperature was maintained at approximately 40–45° C. during the entire time of adding the hydrocarbon material to the phenol catalyst mixture. The time required for this addition of hydrocarbon material was 2 hours.

When addition of hydrocarbon fraction had been completed heat was applied, the stirring being continued, and slow reflux was allowed to take place for 2 hours. The temperature during the reflux period was 120–160° C.

After cooling to 100° C., the sulfuric acid in the mixture was neutralized by adding the calculated quantity of $Na_2CO_3$ dissolved in a few cc. of water.

The purification of the desired condensation product and the recovery of the excess phenol and saturated hydrocarbon was accomplished as follows:

Without further washing or neutralization, the reaction mixture was distilled from a Claissen flask. A small forerunning was collected up to 160° C. which contained water and unreacted hydrocarbon. Next was obtained a cut consisting of nearly pure phenol which weighed 213.7 grams. Then using a vacuum of about 5 mm. absolute pressure 171.0 grams of the desired condensation product of para-methyl styrene and phenol came over in the range 160–235° C. Finally, a small cut containing 12.3 grams of material was taken which came over at 235–255° C. Only a small residue (about 10 grams) remained in the distilling flask at the end of the distillation.

Subsequent experiments have shown that the material taken at a temperature of 160–235° C. under the above conditions, consists largely of a condensation product made up of 1 molecule of para-methyl styrene with 1 molecule of phenol. The higher boiling material consists predominantly of a product which data indicates to be 2 molecules of para-methyl styrene reacted with 1 molecule of phenol.

The material distilling over from 160–235° C. has the following physical properties:

| | |
|---|---|
| Color (Gardner Holt) | 1.0 |
| Sp. gr. | 1.0712 20/4 |
| Ref. index | N 20/D—1.58693 |
| Mol. weight | 224.8 |
| Zerewitinoff value per cent | 92.2 |

The product which distilled at 235–255° C. using a pressure of about 5 mm. is a viscous amber liquid which has characteristics leading me to believe it is predominately a compound formed by a condensation of 2 mols. of para-methyl styrene with 1 mol of phenol.

Decreasing the proportion of phenol to para-methyl styrene in the reaction, decreases the proportion of para-methyl styrene converted to mono para-methyl styryl phenol and increases the proportion converted to di para-methyl styryl phenol. Increasing the excess of phenol increases the proportion of the mono substituted product.

The following is an illustrative example of the production of an aldehyde condensation resin employing an aralkyl phenol of the type of the present invention.

*Example 2*

⅓ mol (71 grams) of para-methyl styryl phenol, ⅔ mol of formaldehyde (54 grams of 37% formaldehyde) and 1% (0.7 gram) of oxalic acid were refluxed slowly with agitation for approximately 20 hours. After being cooled, a dirty white highly viscous substance was obtained. After steam distillation at slightly above 200° C. for 2 hours, the residue was found to be a resinous material of fairly light color with the following properties and yield:

| | |
|---|---|
| Boiling range at 3 mm. pressure °C | 160–235 |
| Yield of resin grams | 55 |
| Yield, per cent of theoretical percent | 68 |
| Melting point °C | 78.3 |
| Color—Gardner Holt | 6 |

Compatible with linseed oil at 125° C. and with tung oil.

The solubility of the resins of the present invention in drying oils such as linseed oil and tung oil permits the utilization of the desirable characteristics of phenol aldehyde resins in coating compositions formulated with drying oils and provides new coating compositions with very superior qualities.

Thus a new field is opened for phenol aldehyde resins as well as a new field of utilization for unsaturated aralkyl hydrocarbons of the type described herein. The potential supply of these hydrocarbons in light oil from the pyrolysis of petroleum is very large.

The specific processes described above and the specific sources of styrene homologues employed in producing the compositions of the present invention have been set forth for illustrative purposes. Other sources and other processes may be employed as will occur to those skilled in the art.

Having particularly described my invention, it is to be understood that this is by way of illustration and that changes, omissions, additions, substitutions and/or modifications might be made within the scope of the claims without departing from the spirit of the invention, which is intended to be limited only as the prior art may require.

I claim:

1. An aralkyl phenol produced by condensing a nuclearly lower alkylated styrene with a hydroxylated aromatic hydrocarbon having a hydrogen atom in at least one of the positions ortho and para to a hydroxyl group.

2. An aralkyl phenol produced by condensation of a nuclearly lower alkylated styrene with a phenol.

3. An aralkyl phenol produced by condensation of a nuclearly methylated styrene with a phenol.

4. An aralkyl phenol produced by condensation of a nuclearly methylated styrene and phenol.

5. An aralkyl phenol produced by condensation of a phenol and a nuclearly lower alkylated styrene in the molecular ratio of one to one.

6. An aralkyl phenol produced by condensation of a phenol and a nuclearly lower alkylated styrene in the molecular ratio of one to two respectively.

7. An aralkyl phenol produced by condensation of phenol and para-methyl styrene.

8. An aralkyl phenol produced by condensation of phenol and meta-methyl styrene.

9. An aralkyl phenol produced by condensation of phenol and a light oil fraction of nuclearly methylated styrene, said fraction boiling between 167° C. and 175° C.

10. An aralkyl phenol produced by condensation of phenol and a light oil para-methyl styrene fraction, said condensation product boiling within the range of from 160° C. to 235° C. at an absolute pressure of approximately 5 mm. Hg.

11. An aralkyl phenol produced by condensation of phenol and a light oil para-methyl styrene fraction, said condensation product boiling within the range of 235° C. to 255° C. at an absolute pressure of approximately 5 mm. Hg.

12. A method of preparing an aralkyl phenol which comprises reacting a nuclearly lower alkylated styrene with a phenol.

13. A method of preparing an aralkyl phenol which comprises reacting a phenol with a nuclearly lower alkylated styrene in the presence of a condensation catalyst.

14. A mixture of aralkyl phenols produced by the condensation of a phenol with nuclearly lower alkylated styrene.

15. A method of preparing an aralkyl phenol which comprises reacting a nuclearly lower alkylated styrene with phenol in the presence of a small proportion of a condensation catalyst.

16. A method of preparing an aralkyl phenol which comprises reacting a nuclearly lower alkylated styrene with a hydroxylated aromatic hydrocarbon having a hydrogen atom in at least one of the positions ortho and para to a hydroxyl group, in the presence of a mineral acid catalyst.

17. A method of preparing an aralkyl phenol which comprises reacting phenol with a nuclearly methylated styrene in the presence of a condensation catalyst.

18. A method of preparing an aralkyl phenol which comprises reacting phenol and a light oil fraction of nuclearly methylated styrene in the presence of a condensation catalyst, said fraction boiling between 167° and 175° C.

19. A method of preparing an aralkyl phenol which comprises reacting phenol and a light oil para-methyl styrene fraction in the presence of a condensation catalyst.

20. A method of preparing an aralkyl phenol which comprises reacting phenol and a light oil para-methyl styrene fraction in the presence of a mineral acid catalyst, said fraction boiling between 167° and 172° C.

ALGER L. WARD.